US009122796B2

(12) United States Patent
Bates et al.

(10) Patent No.: US 9,122,796 B2
(45) Date of Patent: Sep. 1, 2015

(54) RECREATING TIMING ISSUES DURING PROGRAM DEBUG

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/038,853

(22) Filed: Sep. 27, 2013

(65) Prior Publication Data
US 2015/0095710 A1    Apr. 2, 2015

(51) Int. Cl.
*G06F 11/36* (2006.01)
(52) U.S. Cl.
CPC .................................. *G06F 11/3636* (2013.01)
(58) Field of Classification Search
CPC  G06F 11/362; G06F 11/3668; G06F 11/3636
USPC ......................................................... 717/124
See application file for complete search history.

(56) References Cited

U.S. PATENT DOCUMENTS

| | | | |
|---|---|---|---|
| 6,601,188 B1* | 7/2003 | Wilding ........................... | 714/15 |
| 6,792,559 B1 | 9/2004 | Cohen et al. | |
| 7,496,916 B2 | 2/2009 | Dettinger et al. | |
| 7,770,155 B2 | 8/2010 | Bates et al. | |
| 7,958,512 B2 | 6/2011 | Lupu et al. | |
| 2006/0271345 A1 | 11/2006 | Kasuya | |
| 2008/0270988 A1* | 10/2008 | Li et al. ........................ | 717/125 |
| 2009/0113399 A1* | 4/2009 | Tzoref et al. .................. | 717/130 |
| 2011/0078666 A1 | 3/2011 | Altekar | |
| 2012/0096441 A1* | 4/2012 | Law et al. ..................... | 717/127 |

FOREIGN PATENT DOCUMENTS

CN        101719090 A      6/2010

OTHER PUBLICATIONS

Boothe, Efficient Algorithms for Bidirectional Debugging, 2000 ACM 1-58113-199-2/00/0006, p. 300.*
Choi, et al., "Isolating Failure-Inducing Thread Schedules", ISSTA' 02, Proc. of the ACM SIGSOFT 2002 International Symposium of Software Testing and Analysis, © 2002 ACM.
Rungta, N. et al., "Efficient Testing of Concurrent Programs with Abstraction-Guided Symbolic Execution", Proc. 16th International SPIN Workshop on Model Checking Software, 2009.
Zamfir, C. et al., "Execution Synthesis: A Technique for Automated Software Debugging", EuroSys'10, Apr. 13-16, Paris, France. 14 pages. © 2010 ACM.

* cited by examiner

*Primary Examiner* — Li B Zhen
*Assistant Examiner* — Zengpu Wei
(74) *Attorney, Agent, or Firm* — Penny L. Lowry; James R. Nock

(57) ABSTRACT

A method for debugging a program having a plurality of threads includes identifying, for each thread, a target point at which the program terminated and a staging point previously executed in the thread. The method further includes executing each thread from the staging point to the target point and determining, for each thread, a staging time based upon the executing of each thread from the staging point to the target point. The method further includes executing each thread from its staging point based on the staging time of the thread so that the plurality of threads will reach the crash location at approximately the same time such that the program threads execute in a similar pattern to the execution that caused the crash.

8 Claims, 4 Drawing Sheets

|  | Thread 1 | Thread 2 | Thread 3 | Thread 4 |
|---|---|---|---|---|
| Call Stack | xyx<br>x1x<br>main | foo<br>abc<br>efg<br>hij | foo<br>abc<br>efg<br>hij | zzz<br>yyy<br>www<br>hij |
| Crash Point | xyx, line 40 | foo, line 5 | foo, line 10 | zzz, line 30 |
| Staging Point | main() at call to x1x() | efg() at call to abc() | efg() at call to abc() | www() at call to yyy() |
| Target Point | xyx, line 40 | foo, line 5 | foo, line 10 | zzz, line 30 |
| Staging Time | 300 ms | 50 ms | 200 ms | 100 ms |
| Release Time | 0 ms | 250 ms | 100 ms | 200 ms |

FIG. 3

RECREATING TIMING ISSUES DURING PROGRAM DEBUG

FIELD

This disclosure relates to program recreation. In particular, it relates to a method for timed thread release of a program.

BACKGROUND

A debugger is a computer program used to detect and correct errors in a target computer program. Many debuggers have a feature that allows a user to stop execution of the target computer program and analyze variables in the program. A program running a debugger may provide additional information which assists in debugging a program.

SUMMARY

In embodiments of the disclosure, a method for debugging a program having a plurality of threads includes identifying, for each thread, a target point at which the program terminated and a staging point previously executed in the thread. The method further includes executing each thread from the staging point to the target point and determining, for each thread, a staging time based upon the executing of each thread from the staging point to the target point. The method further includes executing each thread from its staging point based on the staging time of the thread so that the plurality of threads will reach the target point at approximately the same time.

In other embodiments of the disclosure, a method for debugging a program having a plurality of threads includes identifying a first staging point and a first target point for a first thread and a second staging point and a second target point for a second thread. The method further includes determining a first staging time for the first thread to execute from the first staging point to the first target point and a second staging time for the second thread to execute from the second staging point to the second target point. The method further includes executing the first thread from the first staging point and the second thread from the second staging point based on the first staging time and the second staging time, so that the first thread and the second thread terminate at approximately the same time.

In other embodiments of the disclosure, a computer readable storage medium for debugging a program having a plurality of threads, the computer readable storage medium having instructions stored thereon which, when executed, cause one or more processors to perform the following operations: identify, for each thread, a target point at which the program crashed; identify, for each thread, a staging point previously executed in the thread; execute each thread from the staging point to the target point; determine, for each thread, a staging time based upon the execution of each thread from the staging point to the target point; and execute the program from the staging point so that each thread will reach its target point at approximately the same time by taking into account the staging time for each thread.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 3 is an example of a table of debug timing data for four different threads, according to embodiments of the disclosure.

DETAILED DESCRIPTION

Aspects of the present disclosure relate to program recreation, while more particular aspects relate to a method for timed thread release of a program. While the present invention is not necessarily limited to such applications, various aspects of the invention may be appreciated through a discussion of various examples using this context.

When a multi-thread program running on a system terminates unexpectedly, the system may record a copy of the memory and state of the program to a dump file on the system. Information from the crash in the dump file, such as the program counter location of each thread when the application crashed, thread call stacks, and memory, may be retrieved and analyzed to determine the cause of the termination. While a program crash may be the consequence of a problem, the actual cause of the problem may be at some point in the program before the termination, where contention between two or more threads caused the program's data to become unstable and inconsistent. Analyzing the progression of the threads at the time of the termination may not be enough to determine the problem, as it may not reproduce timing issues with the threads that developed earlier in the program's execution. To more accurately reproduce a problem, threads may be executed in a manner similar to how they were executed leading up to the termination.

According to embodiments of the disclosure, a debugger may recreate a program termination through a program execution mode that analyzes thread information in the dump and runs the program in a way that is capable of recreating any timing issues of the termination by taking into account the thread information. For each thread, the debugger identifies a staging point prior to the point at which the thread terminated and determines a staging time for the thread to run from the staging point to a target point. Once each thread's staging time has been determined, the debugger enters a run mode where the threads are held at the staging points and given a staggered release so that all the threads will reach their target points at around the same time. By executing the threads at a distance from the target point and synchronizing the threads to reach their target points at approximately the same time, the debugger may recreate execution of the program leading up to the termination and recreate the problem. Simply ensuring all the threads execute code at the crash locations at the same time may not reproduce the same execution patterns prior to the crash that actually caused the problem.

Figure 1:
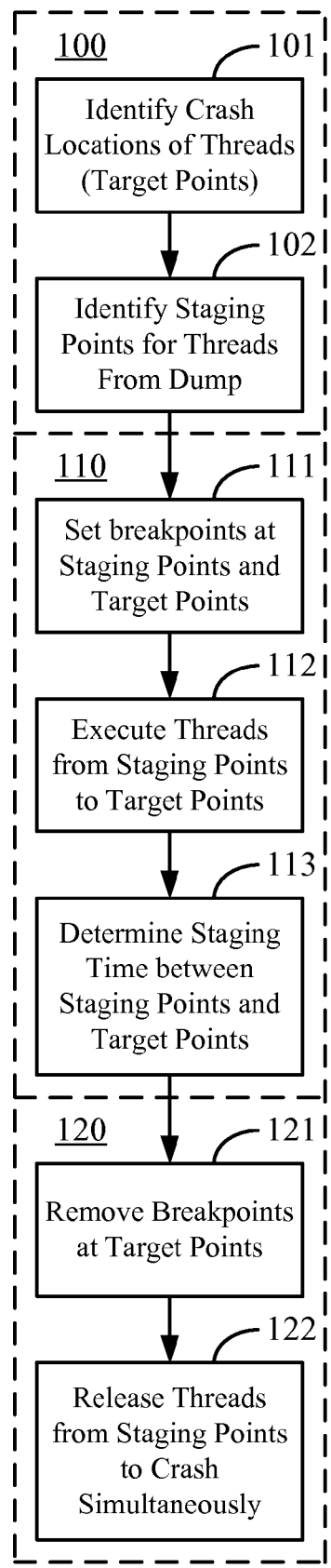
FIG. 1 is a diagram of a method for recreating timing for a crash in a program, according to embodiments of the disclosure.

FIG. 1 is a diagram of a method for recreating a crash in a program, according to embodiments of the disclosure. A target point and a staging point are identified for each thread as the respective start and end points for a staging determination, as in 100. The target point for a thread can be the instruction at which the thread's execution had reached when the program crashed, and can be identified from the extent of the thread's execution taken from the system dump, as in 101. As mentioned above, the system dump may contain the working memory of a computer program at the time of the crash, including the call stack and the last instruction executed leading up to the termination. This last instruction may be selected as the target point.

To simulate the crash, the debugger may run a thread from an instruction in the thread at which the thread was known to have operated prior to the target point. A previous instruction in each thread known to have been executed may be identified as a staging point, as in 102. To ensure that the staging point was a previously executed instruction in the thread, the staging point may be selected from a point on the call stack of the thread found in the system dump, such as a function call to a subroutine on the call stack. If a subroutine is on the call stack, then the subroutine will have been called at some point in the program, making the function call to the subroutine a good candidate for a staging point. The staging points may be any number of frames up the call stack from the target point for the thread. There may be more than one staging point for each thread.

After the target point and the staging point for each thread have been identified, the time from the staging point to the target point of each thread is computed, as in 110. The timing bounds for this computation may be established by setting breakpoints at the staging point and the target point for each thread, as in 111. Each thread of the program may be run up to the staging point, at which point the thread triggers a breakpoint and stops execution. Each thread may then be executed from its staging point to its target point, as in 112. The execution time between the staging point and the target point in each thread, referred to as the staging time, is determined, as in 113. If a thread has multiple staging points, the execution time between a current staging point and the following point, whether another staging point or a target point, may be computed until the target point is reached.

Once the staging times for the threads have been determined, the threads may be executed from their staging points taking into account the staging time of each thread, as in 120, so that the threads will arrive at their target points at approximately the same time. The breakpoints previously placed at the target points are removed, as in 121. The threads are run up to their staging points, triggering a breakpoint and stopping execution of each thread. Each thread is released from its staging point according to its staging time so that all the threads will reach their crash locations at approximately the same time, as in 122. Once the problem is recreated, the staging and target points may be saved so as to later recreate the problem.

According to embodiments of the invention, if the threads do not crash simultaneously at the previous crash locations, the staging point(s) of a thread may be adjusted and the staging time(s) of the thread determined. A staging point may be moved up or down the stack so as to allow more or less code to run before the termination. The debugger may prioritize this adjustment of the staging point of each thread according to the dominance of the thread in the program's performance at the time of the crash. If a thread does not terminate within a defined period of time, the debugger may terminate the thread.

Additionally, if a called function on the call stack is part of more than one thread, such that one staging point has more than one target point associated with it, the debugger may record which threads have that particular staging point and release the threads from that staging point according to the threads' staging times. For example, if a called function has target point breakpoints at two different locations in the function, such that a first thread will trigger a second thread's target breakpoint before reaching its own target point, the debugger may track the first thread's execution and release the first thread from the breakpoint.

Figure 2:
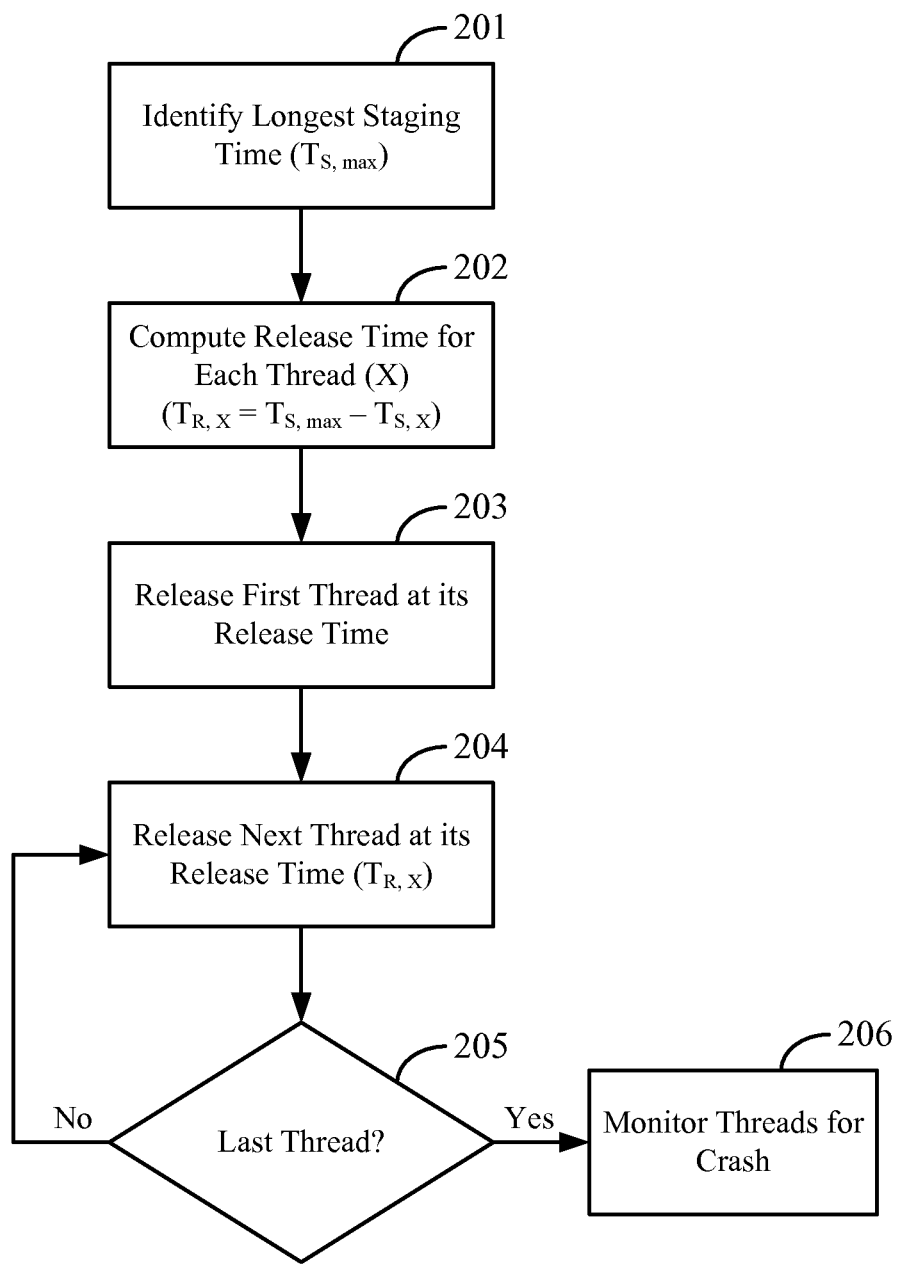
FIG. 2 is a flowchart of a method to determine release of threads in the method of FIG. 1, according to embodiments of the disclosure.

FIG. 2 is a flowchart of a method to determine timed release of threads, according to embodiments of the disclosure. The method of FIG. 2 may be used with the method of FIG. 1 to release the threads from staging points to terminate at approximately the same time, as in 120, though other methods may be used. The longest staging time ($T_{S,\ max}$) for the plurality of threads (x) is identified, as in 201. The longest staging time is the first thread to be released in 122, and may act as a reference point for the release of the other threads. The release time ($T_{R,x}$) for each thread is computed, as in 202. The release time for a thread may be the difference between the longest release time identified in 201 and the staging time of the thread ($T_{S,\ x}$). The first thread (thread with the longest staging time) is released according to its release time, as in 203.

According to the release times computed in 202, the next thread is released, as in 204. The debugger may track the threads as they are released, and the next released thread may be evaluated as to whether it is the last thread, as in 205. If the thread is not the last thread, the next thread may be released according to its release time, as in 204. If the thread is the last thread, the debugger may monitor the threads for a crash, as in 206.

FIG. 3 is an example of a table of debug timing data for four different threads, according to embodiments of the disclosure. Each thread has an associated call stack from the dump and a crash point. The crash point of each thread is the last instruction of the thread when the program crashed, which may be read from the system dump. The crash point for each thread is selected as the thread's target point. The staging point for each thread is selected from a previous point in the call stack. In this example, the staging point for each thread is selected two frames down the call stack at the call to the next function on the call stack.

Figure 4:
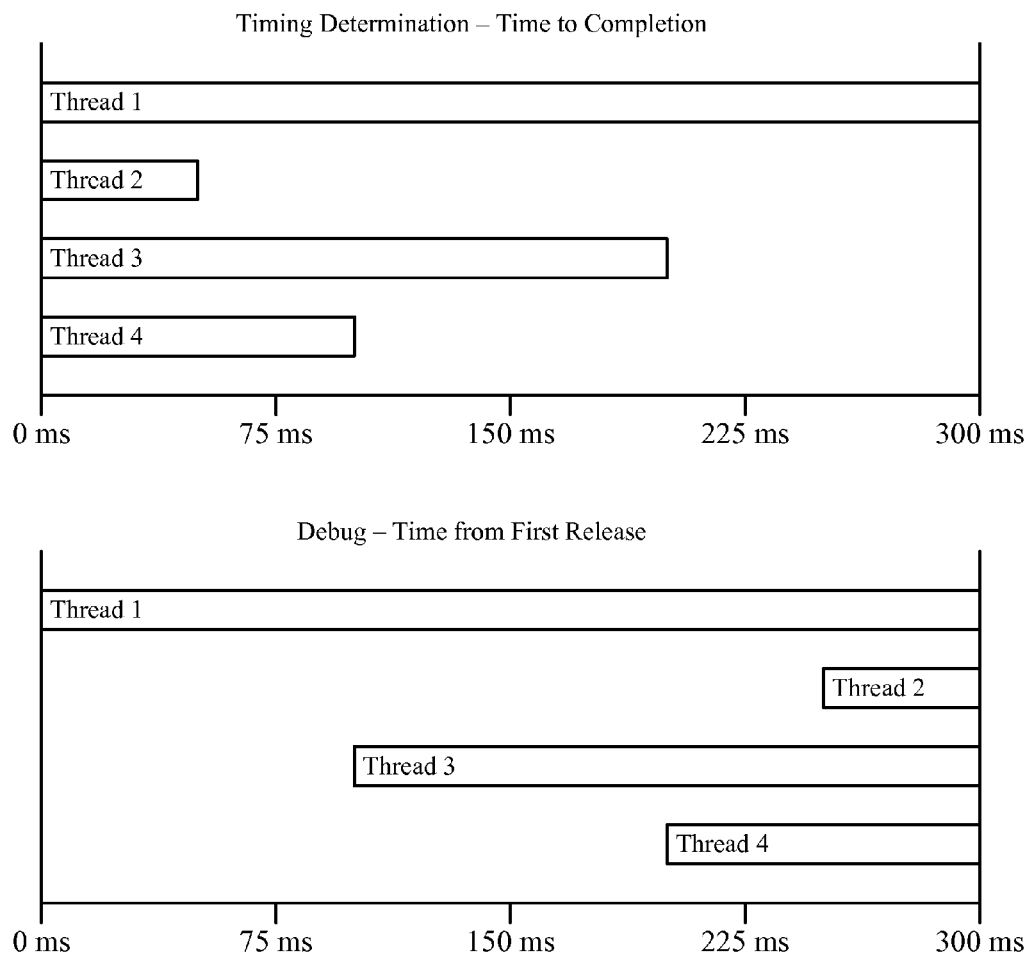
FIG. 4 is an example of a graph of debug timing data for the four threads of FIG. 2, according to embodiments of the disclosure.

FIG. 4 is an example of graphs of debug timing data for the four threads of FIG. 3, according to embodiments of the disclosure. The graphs of FIG. 4 correspond to the staging time data and release time data in FIG. 3. The top graph of FIG. 4 shows the staging time for each thread. Each thread takes a different amount of time to execute from its staging point to its target point.

Referring back to FIG. 3, the release time for each thread may be determined with reference to the staging time of the slowest thread, which will be released first. In this example, the longest staging time belongs to Thread 1, with a staging time of 300 ms. The bottom graph of FIG. 4 shows the time that each thread is released with respect to the first thread, with the first released thread acting as a reference time. The threads are sequenced so that all the threads will reach the crash point at approximately 300 ms after Thread 1 has been released. Referring to FIG. 3, the release times relative to the first released thread are as follows: Thread 1—0 ms; Thread 2—250 ms; Thread 3—100 ms; Thread 4—200 ms. Referring back to FIG. 4, Thread 1 will be released first at 0 ms, followed by Thread 3 at 100 ms, then Thread 4 at 200 ms, and then Thread 2 at 250 ms.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module,"

"device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but is not limited to, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wire line, optical fiber cable, RF, etc., or any suitable combination of the foregoing.

Computer program code for carrying out operations for aspects of the present disclosure may be written in any combination of one or more programming languages, including an object-oriented language such as Java, Smalltalk, C++, or the like, and conventional procedural programming languages, such as "C" programming language or similar programming languages. The program code may execute entirely on the user's computer, partly on the user's computer, as a standalone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although the present invention has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the invention.

What is claimed is:

1. A method for debugging a program having a plurality of threads, comprising:
   identifying, for each thread, a target point in an execution sequence of the thread at which the program terminated;
   identifying, for each thread, a staging point in the execution sequence prior to the target point;
   first executing each thread from its staging point to its target point;
   determining, for each thread, a staging time based upon the first executing of each thread from its staging point to its target point;
   determining, for each thread, a release time based upon its staging time and a longest staging time of the plurality of staging times; and
   second executing each thread so that each thread will reach a crash location at approximately the same time, the second executing including executing each thread up to its staging point, holding at least one thread at its staging point, and releasing each held thread at its release time.

2. The method of claim 1, wherein:
each thread has a call stack; and
identifying, for each thread, the staging point further comprises determining an instruction in the call stack of each thread prior to the target point.

3. The method of claim 1, further comprising:
setting, for each thread, a staging point breakpoint at its staging point and a target point breakpoint at its target point prior to the first executing each thread from its staging point to its target point; and
removing the target point breakpoint from each target point before the second executing each thread.

4. A method for debugging a program having a plurality of threads, comprising:
identifying a first staging point and a first target point for a first thread;
identifying a second staging point and a second target point for a second thread;
setting a first breakpoint at the first staging point and a second breakpoint at the first target point;
executing the first thread from the first breakpoint to the second breakpoint to determine a first staging time;
setting a third breakpoint at the second staging point and a fourth breakpoint at the second target point;
executing the second thread from the third breakpoint to the fourth breakpoint to determine a second staging time;
determining a first release time for the first thread based on the first staging time;
determining a second release time for the second thread based on the second staging time;
executing the first thread to the first staging point and the second thread to the second staging point;
holding the first thread at the first staging point and the second thread at the second staging point;
releasing the first thread from the first staging point at the first release time; and
releasing the second thread from the second staging point at the second release time, so that the first thread reaches the first target point and the second thread reaches the second target point at approximately the same time.

5. The method of claim 4, wherein:
identifying the first staging point further comprises selecting a previously executed instruction from a first call stack for the first thread from a dump of the program; and
identifying the second staging point further comprises selecting a previously executed instruction from a second call stack for the second thread from the dump of the program.

6. A non-transitory computer readable storage medium for debugging a program having a plurality of threads, the computer readable storage medium having instructions stored thereon which, when executed, cause one or more processors to perform the following operations:
identify, for each thread, a target point in an execution sequence of the thread at which the program crashed;
identify, for each thread, a staging point in the execution sequence prior to the target point;
first execute each thread from its staging point to its target point;
determine, for each thread, a staging time based upon the first execution of each thread from its staging point to its target point;
determine, for each thread, a release time based upon its staging time and a longest staging time of the plurality of staging times; and
second execute each thread so that each thread will reach its target point at approximately the same time, the second execution including executing each thread up to its staging point, holding at least one thread at its staging point, and releasing each held thread at its release time.

7. The computer readable storage medium of claim 6 wherein the instructions, when executed, further cause the one or more processors to:
set, for each thread, a staging point breakpoint at the staging point and a target point breakpoint at the target point prior to the first execution of each thread from its staging point to its target point; and
remove the target point breakpoint from each target point before the second execution of each thread.

8. The computer readable storage medium of claim 6 wherein:
each thread has a call stack; and
the instructions, when executed, further cause the one or more processors to identify, as the staging point for each thread, a previous point in the call stack of the thread.

* * * * *